US009643514B2

(12) United States Patent
Matsuda

(10) Patent No.: US 9,643,514 B2
(45) Date of Patent: May 9, 2017

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 323 days.

(21) Appl. No.: 14/368,779

(22) PCT Filed: Dec. 28, 2011

(86) PCT No.: PCT/JP2011/007336
§ 371 (c)(1),
(2), (4) Date: Jul. 7, 2014

(87) PCT Pub. No.: WO2013/098895
PCT Pub. Date: Jul. 4, 2013

(65) Prior Publication Data
US 2014/0345827 A1    Nov. 27, 2014

(51) Int. Cl.
*B60L 11/18* (2006.01)
*B62D 11/04* (2006.01)
(Continued)

(52) U.S. Cl.
CPC ........... *B60L 11/1874* (2013.01); *B60L 1/003* (2013.01); *B60L 1/02* (2013.01); *B60L 3/003* (2013.01);
(Continued)

(58) Field of Classification Search
CPC . B62K 11/04; B62K 2208/00; B60L 11/1874; B60L 11/1892
See application file for complete search history.

(56) References Cited

U.S. PATENT DOCUMENTS 7,261,172 B2 *  8/2007  Tsukada ................. B60K 1/00
                                               180/229
7,931,110 B2 *  4/2011  Nishiura ................ B60L 11/18
                                               180/218
(Continued)

FOREIGN PATENT DOCUMENTS

EP    0469995 A1    2/1992
EP    2168860 A1    3/2010
(Continued)

OTHER PUBLICATIONS

European Patent Office, Extended European Search Report Issued in Application No. 11878476.8, Aug. 31, 2015, Germany, 7 pages.
(Continued)

*Primary Examiner* — Joseph Rocca
*Assistant Examiner* — Daniel Yeagley
(74) *Attorney, Agent, or Firm* — Alleman Hall Creasman & Tuttle LLP

(57) ABSTRACT

A straddle electric vehicle comprises a battery case accommodating a battery which is an electric power supply for an electric motor; an inverter which converts DC power stored in the battery into AC power and supplies the AC power to the electric motor; an air passage through which ram air is guided to an interior of a battery case and discharges air from the battery case; and a radiator for cooling a coolant used to cool the inverter using water or oil, wherein the radiator is placed forward relative to an air inlet of the air passage or within the air passage.

7 Claims, 8 Drawing Sheets

(51) Int. Cl.
*B62K 11/04* (2006.01)
*H02K 9/19* (2006.01)
*B60L 1/00* (2006.01)
*B60L 1/02* (2006.01)
*B60L 3/00* (2006.01)
*B60L 15/20* (2006.01)

(52) U.S. Cl.
CPC ......... *B60L 3/0061* (2013.01); *B60L 11/1803* (2013.01); *B60L 11/1877* (2013.01); *B60L 11/1892* (2013.01); *B60L 15/20* (2013.01); *B62K 11/04* (2013.01); *H02K 9/19* (2013.01); *B60L 2200/12* (2013.01); *B60L 2240/36* (2013.01); *B60L 2240/421* (2013.01); *B60L 2240/461* (2013.01); *B62K 2204/00* (2013.01); *B62K 2208/00* (2013.01); *Y02T 10/641* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(56) References Cited

U.S. PATENT DOCUMENTS

| | | | | |
|---|---|---|---|---|
| 8,056,658 | B2* | 11/2011 | Horii | B62K 3/005 180/65.1 |
| 8,167,070 | B2* | 5/2012 | Takamura | B60K 1/04 180/68.2 |
| 8,783,405 | B2* | 7/2014 | Irie | B62K 11/04 180/220 |
| 2002/0162693 | A1* | 11/2002 | Mizuno | B60L 11/1892 180/65.1 |
| 2010/0163326 | A1* | 7/2010 | Takamura | B60K 1/04 180/68.5 |
| 2011/0139531 | A1* | 6/2011 | Kanno | B60L 3/0023 180/220 |

FOREIGN PATENT DOCUMENTS

| | | |
|---|---|---|
| JP | 04024185 A | 1/1992 |
| JP | 05065085 A | 3/1993 |
| JP | 2000294301 A | 10/2000 |
| JP | 2001114173 A | 4/2001 |
| JP | 2004279668 A | 10/2004 |
| JP | 2005001410 A | 1/2005 |
| JP | 2006044539 A | 2/2006 |
| JP | 2006060931 A | 3/2006 |
| JP | 2007141475 A | 6/2007 |
| JP | 2008100574 A | 5/2008 |
| JP | 2008247325 A | 10/2008 |
| JP | 2009090696 A | 4/2009 |
| JP | 2010100124 A | 5/2010 |
| JP | 2010228660 A | 10/2010 |
| JP | 2011162152 A | 8/2011 |

OTHER PUBLICATIONS

ISA Japanese Patent Office, International Search Report of PCT/JP2011/007336, Apr. 17, 2012, WIPO, 2 pages.

* cited by examiner

STRADDLE ELECTRIC VEHICLE

TECHNICAL FIELD

The present invention relates to a straddle vehicle such as an ATV (all terrain vehicle) or a motorcycle, and a straddle electric vehicle which drives by a driving power generated by an electric motor.

BACKGROUND ART

In recent years, a straddle electric vehicle which incorporates as a driving power source an electric motor activated by electric energy stored in a battery has been developed. In the straddle electric vehicle, to ensure the reliability of its operation, it is necessary to control the temperatures of electric components such as an electric motor, an inverter, and a battery. To this end, regarding the straddle electric vehicle, it is proposed that ram air be guided to the interior of a battery case accommodating the battery to cool the battery using air, and an air outlet provided in the battery case faces the inverter to directly apply the air discharged from the battery case to the inverter (see e.g., Patent Literature 1).

CITATION LIST

Patent Literature

Patent Literature 1: Japanese Laid-Open Patent Application Publication No. 2001-114173

SUMMARY OF INVENTION

Technical Problem

It is demanded that the battery be cooled with air while avoiding a situation in which moisture contained in the ram air enters the battery case, and thereby a problem arises in the battery and an electric circuit connected to the battery. A straddle electric vehicle of a sport type intended to attain a high motion capability, is required to provide an output and an instantaneous force which are greater than those of a conventional electric vehicle. Therefore, it is necessary to increase a current supplied to the electric motor. Under the circumstances, the inverter is likely to be cooled insufficiently only by the ram air and the air discharged from the battery case.

Accordingly, an object of the present invention is to provide a straddle electric vehicle which is capable of cooling a battery and other electric components with a simple structure and suitably suppressing occurrence of a problem in the battery or the like.

Solution to Problem

The present invention has been developed to achieve the above object. According to the present invention, there is provided a straddle electric vehicle which drives by a driving power generated by an electric motor, comprising: a battery case accommodating a battery which is an electric power supply for the electric motor; an inverter which converts DC power stored in the battery into AC power and supplies the AC power to the electric motor; an air passage through which ram air is guided to an interior of the battery case and discharges air from the battery case; and a radiator for cooling a coolant used to cool the inverter or the electric motor using water or oil, wherein the radiator is placed forward relative to an air inlet of the air passage or within the air passage.

In accordance with this configuration, since the electric motor or the inverter is cooled with water or oil, the electric motor or the inverter is cooled more effectively. In contrast, the battery is cooled with air. Therefore, it becomes possible to avoid that the cooling system mounted in the straddle electric vehicle becomes complex in configuration and increases in size. The radiator for cooling the coolant for the inverter is placed within the air passage through which the air flows or forward relative to the air inlet within the air passage. Since this air is the ram air, the coolant can be cooled well.

The radiator may be placed upstream of the battery case within the air passage.

In accordance with this configuration, the ram air is blown into the radiator, and therefore the coolant can be cooled well. In addition, the radiator serves as a filter to separate moisture from the ram air moving toward the battery case. Therefore, without a need to design a member constituting the air passage toward the battery case so that it has a very intricate shape, it becomes possible to reduce a possibility of ingress of moisture into the battery case. Furthermore, the radiator can be protected from the outside by the member constituting the air passage.

The straddle electric vehicle may comprise an air box which is attached to an upper portion of the battery case and constitutes a portion of the air passage, wherein an upper portion of the air box may be openable and closable, and the radiator may be placed inside the air box.

In accordance with this configuration, the coolant can be cooled by utilizing air for cooling the battery, and maintenance work for the radiator can be carried out more easily. In addition, the radiator can be protected from the outside by the air box.

The air passage may have an extended section which is extended downward, the radiator may be placed in the extended section, and the extended section may be provided with a drain hole at a lower end of the extended section.

In accordance with this configuration, the extended section can capture moisture. In association with the filtering effect of the radiator, a water separation capability can be further enhanced. The drain port provided at the lower end of the extended section can prevent moisture captured in the extended section from flowing to a downstream side.

The radiator may be placed downstream of the battery case within the air passage.

In accordance with this configuration, the battery can be cooled more effectively while cooling the coolant by utilizing air for cooling the battery. In addition, the radiator can be protected from outside by the member constituting the air passage.

Advantageous Effects of Invention

As should be appreciated from the above, in accordance with the present invention, it becomes possible to cool a battery and other electric components with a simple structure and suitably suppress the occurrence of problems in the battery or the like. The above and further objects, features and advantages of the present invention will more fully be apparent from the following detailed description of preferred embodiments with accompanying drawings.

DESCRIPTION OF EMBODIMENTS

Hereinafter, embodiments of the present invention will be described with reference to the accompanying drawings. Throughout the drawings, the same or corresponding components are designated by the same reference symbols and will not be described repeatedly in detail. The stated directions are referenced from the perspective of a rider riding in an electric motorcycle which is an exemplary straddle electric vehicle according to the embodiment of the present invention.

Figure 1:
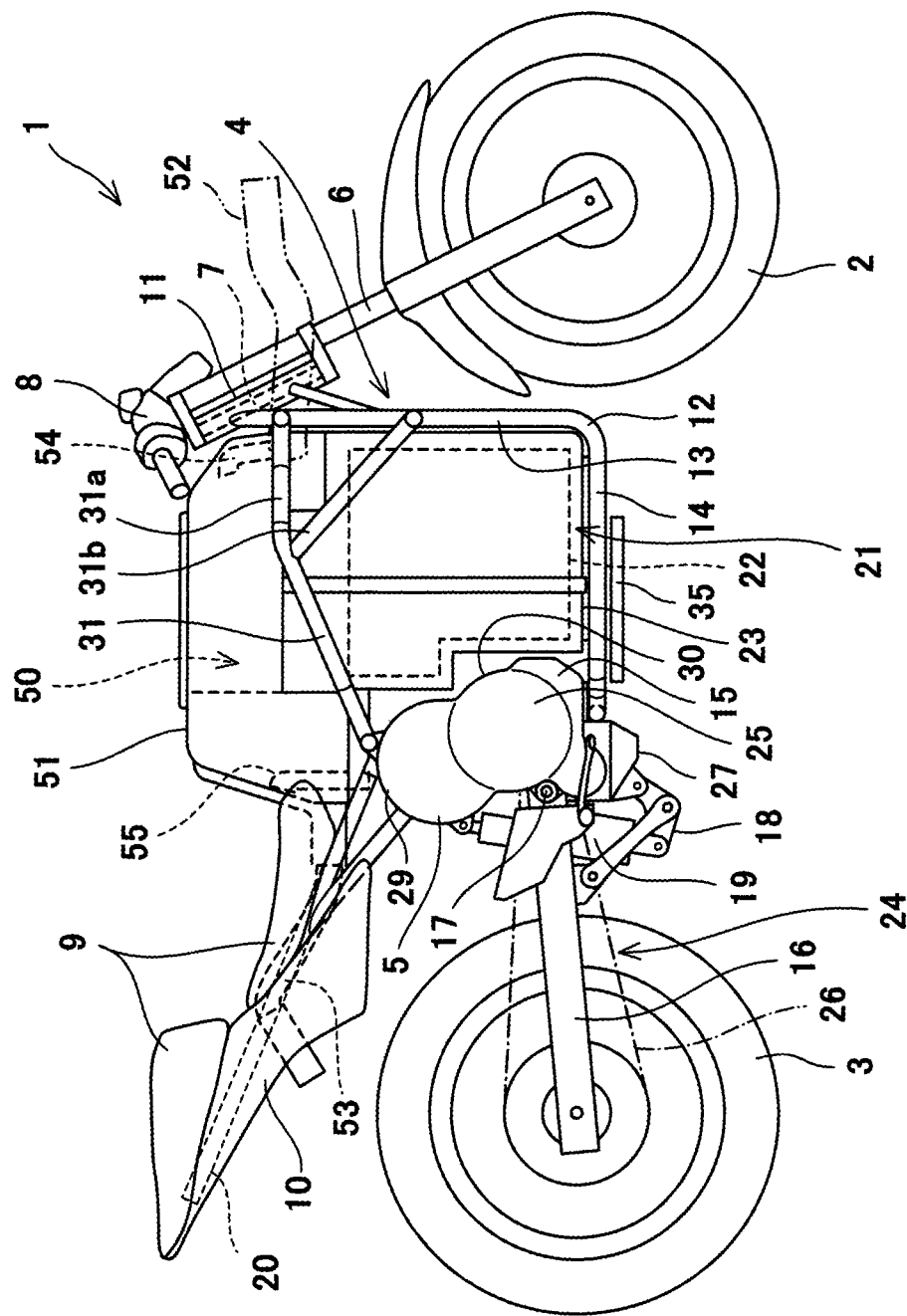
FIG. 1 is a right side view of an electric motorcycle which is an exemplary straddle electric vehicle according to Embodiment 1 of the present invention.

FIG. 1 is a right side view of an electric motorcycle which is an exemplary straddle electric vehicle according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by a driving power generated by the electric motor 5. In the electric motorcycle 1 of the present embodiment, a driving power transmission mechanism 24 for transmitting a rotation of the electric motor 5 to the rear wheel 3 includes a transmission 25.

The electric motorcycle 1 includes a motor unit case 15 including a motor accommodating section 29 accommodating the electric motor 5 and a transmission accommodating section 30 accommodating the transmission 25 such that the motor accommodating section 29 and the transmission accommodating section 30 are unitarily joined together. In other words, the motor unit case 15 accommodates the electric motor 5 and the transmission 25. The electric motor (or motor accommodating section 29) is positioned above the transmission 25 (or transmission accommodating section 30). The motor unit case 15 is elongated in a direction in which the motor accommodating section 29 and the transmission accommodating section 30 are arranged. As a result, the motor unit case 15 is mounted in the electric motorcycle such that it extends vertically.

The motor accommodating section 29 is provided in the upper portion of the motor unit case 15, while the transmission accommodating section 30 is provided in the lower portion of the motor unit case 15. The bottom portion of the motor unit case 15 constitutes an oil pan 27 for reserving oil. The oil is used as a coolant for cooling the electric motor 5 and an inverter 35 and as a lubricant for lubricating sliding portions of the transmission 25. The motor unit case 15 also accommodates an oil pump 28 which discharges the oil reserved in the oil pan 27. The oil pump 28 is placed between the transmission 25 and the oil pan 27 in a vertical direction.

The front wheel 2 is rotatably mounted to the lower portion of a front fork 6 extending substantially vertically. A steering shaft 7 for steering the front wheel is coupled to the upper portion of the front fork 6, and a handle 8 is attached to the upper portion of the steering shaft 7.

The vehicle body frame 4 includes a head pipe 11, a pair of right and left main frames 12, and a pair of right and left sub-frames 31. The steering shaft 7 is supported by the head pipe 11 such that the steering shaft 7 is rotatable. The main frames 12 are unitarily joined to the head pipe 11 such that the main frames 12 extend rearward and downward from the head pipe 11. The main frames 12 include down frame members 13 extending substantially vertically downward from the head pipe 11 and lower frame members 14 extending substantially horizontally rearward from the lower ends of the down frame members 13. The rear end portions of the lower frame members 14 are joined to the front portion of the transmission accommodating section 30. The sub-frames 31 extend rearward and downward from a region in the vicinity of the head pipe 11, above the main frames 12. More specifically, the sub-frames 31 include first sub-frame members 31a extending rearward from the upper end portions of the down frame members 13, and second sub-frame members 31b coupling the first sub-frame members 31a to the vertical intermediate portions of the down frame members 13. The rear end portions of the first sub-frame members 31a are joined to the upper portion of the motor accommodating section 29. As described above, the motor unit case 15 is joined to the main frames 12 and the sub-frames 31, and the motor unit case 15 is constructed as a portion of the vehicle body frame 4.

A swing arm 16 is pivotally coupled to the motor unit case 15. The swing arm 16 extends in a forward or rearward direction. The swing arm 16 is pivotally coupled at its front end portion to the rear portion of the motor unit case 15 and supports the rear wheel 3 by its rear end portion such that the rear wheel 3 is rotatable. The motor unit case 15 has a flange protruding rearward from the rear portion thereof. A pivot 17 around which the swing arm 16 is pivotable is oriented in a rightward or leftward direction so as to penetrate the flange. In this way, in the present embodiment, the motor unit case 15 serves as a swing arm bracket or a pivot frame for supporting the swing arm 16 such that the swing arm 16 is pivotable.

A link mechanism 18 which operates in response to the pivot motion of the swing arm 16 is provided between the lower portion of the swing arm 16 and the bottom portion (in the present embodiment, oil pan 27) of the motor unit case 15. The lower end portion of a rear suspension 19 is coupled to the link mechanism 18 such that the rear suspension 19 is pivotable. The upper end portion of the rear suspension 19 is coupled to the rear portion of the motor unit case 15 such that the rear suspension 19 is pivotable. In this way, the motor unit case 15 also serves as a fastening suspension bracket for mounting the end of the rear suspension 19 to the vehicle body frame 4.

The motor unit case 15 is also joined to a seat frame 20. The seat frame 20 extends rearward from the upper portion of the motor unit case 15 such that it is inclined upward. A seat 9 on which the rider and a passenger are seated in the forward or rearward direction is mounted to the seat frame 20. The electric motorcycle is a straddle vehicle. The rider is seated on the seat 9 while straddling a vehicle body.

The electric motorcycle 1 incorporates a battery unit 21 as an electric power supply for the electric motor 5. The battery unit 21 includes a battery 22 for storing DC power, and a battery case 23 accommodating the battery 22. The battery case 23 is supported on the lower frame members 14 of the main frames 12. The inverter 35 converts the DC power stored in the battery 22 into AC power. The electric motor 5 is activated by the AC power supplied from the inverter to generate the driving power for moving the vehicle body. The driving power generated by the electric motor 5 is transmitted to the rear wheel 3 via the driving power transmission mechanism 24. This allows the rear wheel 3 to rotate. As a result, the electric motorcycle 1 can drive. As described above, the driving power transmission mechanism 24 includes the transmission 25 and a chain 26. The transmission 25 changes the speed of the rotation of the output shaft of the electric motor 5. The chain 26 transmits the rotation with the changed speed, to the rear wheel 3.

The battery case 23 is placed between the front wheel 2 and the rear wheel 3. More specifically, the battery case 23 is placed forward relative to the motor unit case 15 and rearward relative to the down frame members 13 of the main frames 12. In other words, the electric motor 5 is placed rearward relative to the battery case 23, and the transmission 25 is placed rearward relative to the battery case 23. The battery case 23 is supported on the main frames 12 such that it is placed on the lower frame members 14 of the main frames 12. In this structure, it is not necessary to increase the stiffness of the battery case 23 to an excessively high degree, as compared to a case where the battery case 23 is suspended from the vehicle body frame 4. Furthermore, the pair of right and left sub-frames 31 are placed outward relative to the battery case 23 in a vehicle width direction. This allows the side portions of the battery case 23 to be protected by the sub-frames 31.

The electric motorcycle 1 is provided with an air passage 50 which serves to guide ram air to the interior of the battery case 23 and discharge the air from the battery case 23 to the outside air. This allows the battery 22 accommodated in the battery case 23 to be cooled by the air. The outline of the structure relating to the air passage 50 will be described with reference to FIG. 1. An air box 51 is attached to the upper portion of the battery case 23. An air intake duct 52 is connected to the front portion of the air box 51. An air discharge duct 53 is connected to the rear portion of the air box 51.

The front portion of the air box 51 is placed rearward relative to the head pipe 11 and close to the head pipe 11 in the forward or rearward direction. The air intake duct 52 extends forward from the front portion of the air box 51 and opens in its front end portion which is located forward relative to the head pipe 11. The rear portion of the air box 51 covers the upper portion of the motor unit case 15 from above. The rear portion of the air box 51 is placed forward relative to the seat 9 and close to the seat 9 in the forward or rearward direction. An air discharge duct 53 extends rearward along the seat frame 20 from the rear portion of the air box 51 and is placed below the seat 9. The air discharge duct 53 opens in its rear end portion which is located between the seat 9 at an upper side and the rear wheel 3 at a lower side. A cover member 10 is provided below the seat 9, and the side portion of the air discharge duct 53 is covered with the cover member 10, together with the seat frame 20.

During the driving of the electric motorcycle 1, the incoming ram air from the forward direction is taken into the air intake duct 52. Then, the air flows into the air box 51 through the air intake duct 52. Since the inner space of the air box 51 is in communication with the interior of the battery case 23 via the battery case air inlet duct 54, the air flows from the air box 51 into the battery case 23. Also, since the inner space of the battery case 23 is in communication with the air discharge duct 53 via the battery case air outlet duct 55, the air flows from the battery case 23 into the air discharge duct 53. Then, the air is discharged from the air discharge duct 53 to the outside air through an opening in its rear end portion.

Figure 2:
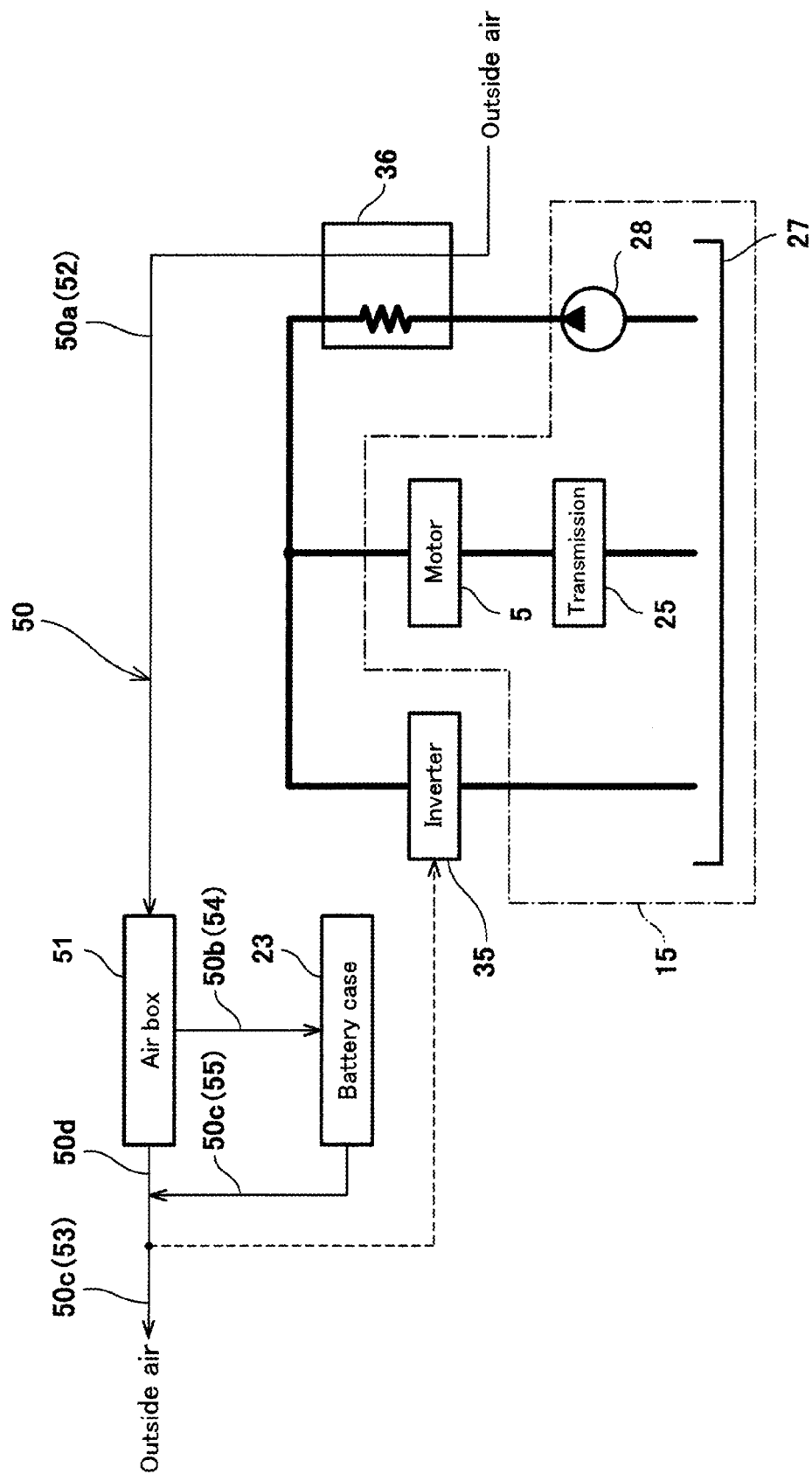
FIG. 2 is a conceptual view showing a configuration of a cooling system in the electric motorcycle of FIG. 1.

FIG. 2 is a conceptual view showing a configuration of a cooling system incorporated in the electric motorcycle 1 of FIG. 1. In FIG. 2, thin lines indicate an air flow (i.e., air passage 50 through which the air flows), and bold lines indicate an oil flow (i.e., oil passage through which oil flows). As shown in FIG. 2, the electric motorcycle 1 includes as the cooling system for cooling the electric components, a configuration for cooling the battery 22 with air and a configuration for cooling the electric motor and the inverter with oil. Alternatively, the electric motor 5 and the inverter 35 may be cooled with water. In a further alternative, either one of the electric motor 5 and the inverter 35 may be cooled with oil or water, and the other of electric motor 5 and the inverter 35 may be cooled with air.

How the battery 22 is cooled with air will now be described. The electric motorcycle 1 is provided with an air passage which serves to guide ram air to the interior of the battery case 23 and discharge the air from the battery case 23. The air passage includes the inner space of the air box 51 attached to the upper portion of the battery case 23. More specifically, the air passage 50 includes a first passage section 50a which serves to take in the ram air from the outside air and deliver it to the interior of the air box 51, a second passage section 50b which serves to deliver the air from the interior of the air box 51 to the interior of the battery case 23, and a third passage section 50c which serves to deliver the air from the battery case 23 to the outside air. The air intake duct 52 constitutes the first passage section 50a, the battery case air inlet duct 54 constitutes the second passage section 50b, and the battery case air outlet duct 55 and the air discharge duct 53 constitute the third passage section 50c. The electric motorcycle 1 of the present embodiment is provided with a bypass passage 50d which communicates the inner space of the air box 51 with the third passage section 50c such that the battery case 23 is bypassed. The bypass passage 50d will be described along with the structure of the air box 51, with reference to FIG. 3. The air discharged from the battery case 23 may be supplied to the inverter 35 which is an electric component required to be cooled particularly (see dotted line of FIG. 2). This allows the inverter 35 to be cooled more effectively.

Next, how electric motor 5 and the inverter 35 are cooled using oil will be described. The electric motorcycle 1 includes the oil pan 27 and the oil pump 28 as described above, and a radiator 36. The oil pump 28 is activated by, for example, the driving power generated by the electric motor 5 and discharges the oil reserved in the oil pan 27. The discharged oil is cooled by heat exchange with the air outside the radiator 36 while flowing through the interior of the radiator 36. The cooled oil is supplied to the electric motor 5 and the inverter 35. The oil supplied to the inverter 35 raises its temperature by heat exchange with the inverter 35 and then is returned to the oil pan 27. By comparison, the inverter 35 receives the oil and thereby is cooled. The oil supplied to the electric motor 5 raises its temperature by heat exchange with the electric motor 5, and then is supplied to sliding sections of the transmission 25 accommodated in the motor unit case 15 by its own weight. The sliding sections of the transmission 25 are lubricated by the oil sent from the electric motor 5. The oil supplied to the transmission 25 is returned to the oil pan 27 by its own weight.

As described above, in the present embodiment, since the electric motor 5 and the inverter 35 are cooled using oil, the electric motor 5 and the inverter 35 are cooled more effectively. Therefore, the temperature of the electric motor 5 and the temperature of the inverter 35 can be controlled properly, and reliability of the operation of these electric components can be improved. In addition, since the oil used for cooling is also used for lubrication, the lubricating system and the oil-cooling system can be simplified as a whole. Moreover, since the battery 22 is cooled using air, the layout of pipes for guiding the oil does not become complex, and the oil-cooling system and the air-cooling system can be configured simply.

The radiator 36 is placed within the air passage 50. This allows the air flowing through the air passage 50 to be utilized as the air which is the coolant which exchanges heat with the oil. Furthermore, the radiator 36 can be protected by the members constituting the air passage 50.

Figure 3:
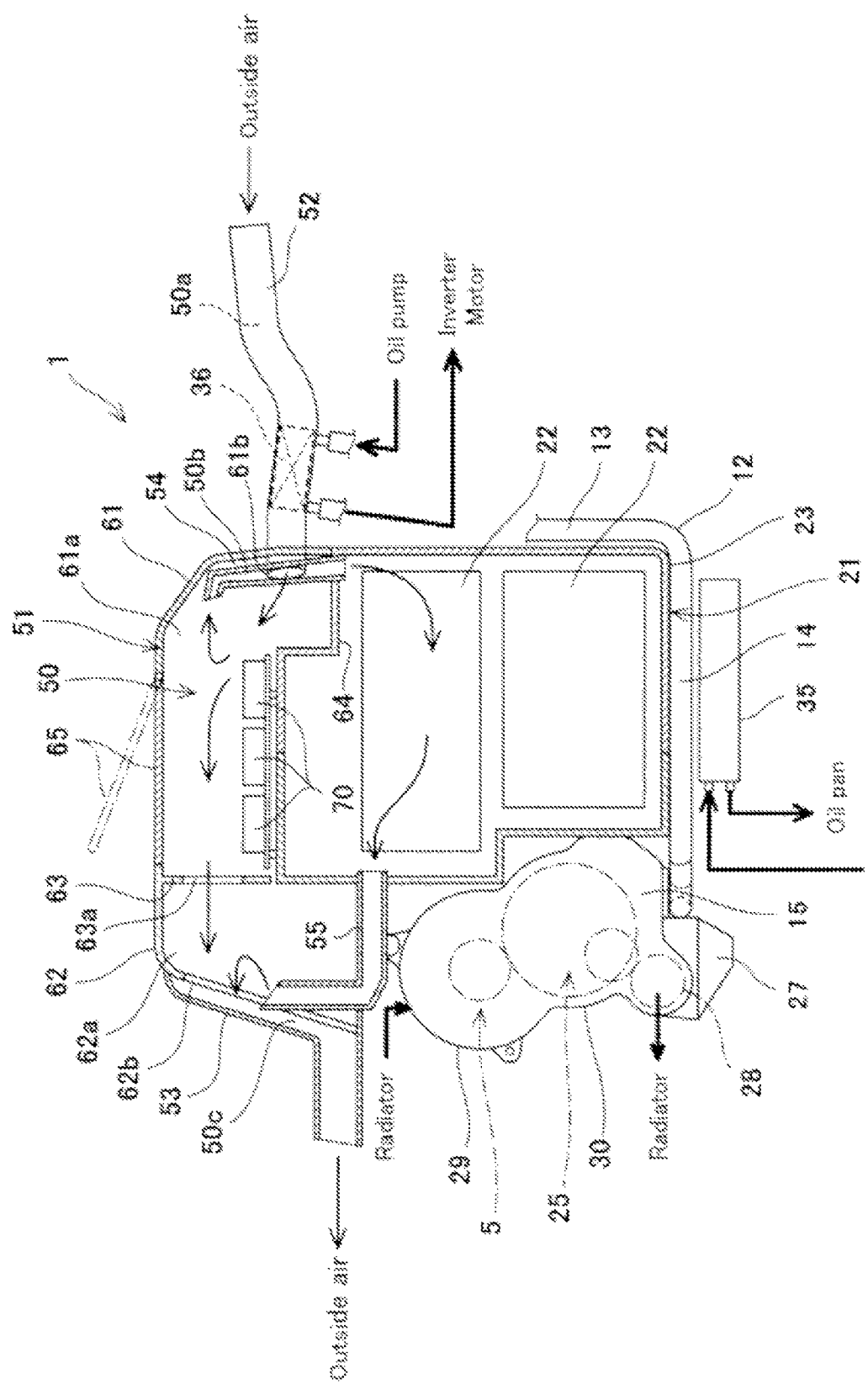
FIG. 3 is a cross-sectional view of a battery case and an air box of FIG. 1.

FIG. 3 is a cross-sectional view of the battery case 23 and the air box 51 of FIG. 1. As shown in FIG. 3, in the present embodiment, the radiator 36 is placed within the first passage section 50a of the air passage 50. In other words, the radiator 36 is placed upstream of the battery case 23 and the air box 51. Since the radiator 36 is placed upstream of the battery case 23, the ram air before heat exchange with the battery 22 can be applied to (blown to) the radiator 36, so that the oil can be cooled well. This allows electric motor 5 and the inverter 35 to be cooled more effectively. In addition, the radiator serves as a filter or a separator for separating moisture from the ram air flowing toward the battery case 23. This can reduce a possibility of ingress of moisture into the battery case 23 without designing the air intake duct 52 so that it is bent in an intricate shape to capture the moisture. In the present embodiment, since the radiator 36 is filled within the air intake duct 52 as shown in FIG. 3, it works as a filter effectively.

The air box 51 includes a front section 61, a rear section 62, a partition wall 63, and a bottom wall 64. The front section 61 of the air box 51 covers the upper portion of the battery case 23 from above. The rear section 62 is provided rearward relative to the front section 61 integrally with the front section 61. The partition wall 63 defines an inner space 61a of the front section 61 and an inner space 62a of the rear section 62 along the forward or rearward direction. The bottom wall 64 has a bottom surface defining the inner space 61a of the front section 61. The bottom wall 64 serves as the upper wall of the battery case 23, and also serves as the wall which vertically defines the inner space of the air box 51 (inner space 61a of the front section 61) and the inner space of the battery case 23.

The front section 61 is provided with a ram air inlet 61b to which the air intake duct 52 is connected and through which the ram air flows into the air box 51. The battery case air inlet duct 54 has a periscope shape and is placed in the inner space 61a of the front section 61. The battery case air inlet duct 54 extends upward from the bottom wall 64 in the inner space 61a of the front section 61 and is bent at its upper end portion to be oriented horizontally. The inlet of the battery case air inlet duct 54 is provided in the upper end portion thereof. Since the battery case air inlet duct 54 is configured and placed as described above, moisture stays on the bottom wall 64 even when moisture enters the inner space of the air box 51. This can reduce a possibility that moisture in the air box 51 flows into the inlet of the battery case air inlet duct 54. This allows the battery 22 to be cooled with the ram air while suitably protecting the battery 22 from moisture.

The battery case air outlet duct 55 extends rearward from the rear wall of the battery case 23, is bent and then extends upward into the inner space of the rear section 62. The battery case air outlet duct 55 opens in the upper end portion located in the inner space 62a of the rear section 62. The air discharge duct 53 covers the rear wall of the rear section 62 from the rear. The rear wall of the rear section 62 is provided with a communication port 62b via which the inner space 62a of the rear section 62 is in communication with the air discharge duct 53. This allows the battery case air outlet duct 55 to be in communication with the air discharge duct 53 via the inner space 62a of the rear section 62 and the communication port 62b.

The partition wall 63 has a through-hole 63a. Because of this, the inner space 61a of the front section 61 bypasses the inner space of the battery case 23, is in communication with the through-hole 63a and the inner space 62a of the rear section 62, and as a result, in communication with the air discharge duct 53. The through-hole 63a and the inner space 62a of the rear section 62 constitute the above described bypass passage 50d. Electric components 70 electrically connected to the battery 22 are accommodated in the inner space 61a of the front section 61. These electric components 70 are placed between the ram air inlet 61b at a front side and the through-hole 63a at a rear side.

In the above described structure, there can be formed an air flow moving from the ram air inlet 61b toward the inlet of the battery case air inlet duct 54 and an air flow moving from the ram air inlet 61b toward the through-hole 63a. The latter air flow allows the electric components 70 to be cooled by utilizing the ram air. A lid 65 which is openable and closable is attached to the upper wall of the front section 61. By opening the lid 65, an operator can access the inner space 61a of the front section 61. The operator can easily carry out maintenance work of the electric components 70.

As described above, in accordance with the present embodiment, the electric components 70 as well as the battery 22 can be suitably cooled by air. In addition, since the ram air utilized to cool the battery 22 and the electric components 70 is also used as a coolant in the radiator 36, the configuration of the overall cooling system can be simplified. Moreover, since the radiator 36 serves as a filter, the battery 22 and the electric components 70 can be protected from the moisture contained in the ram air in the case where the ram air is utilized for cooling.

Figure 4:
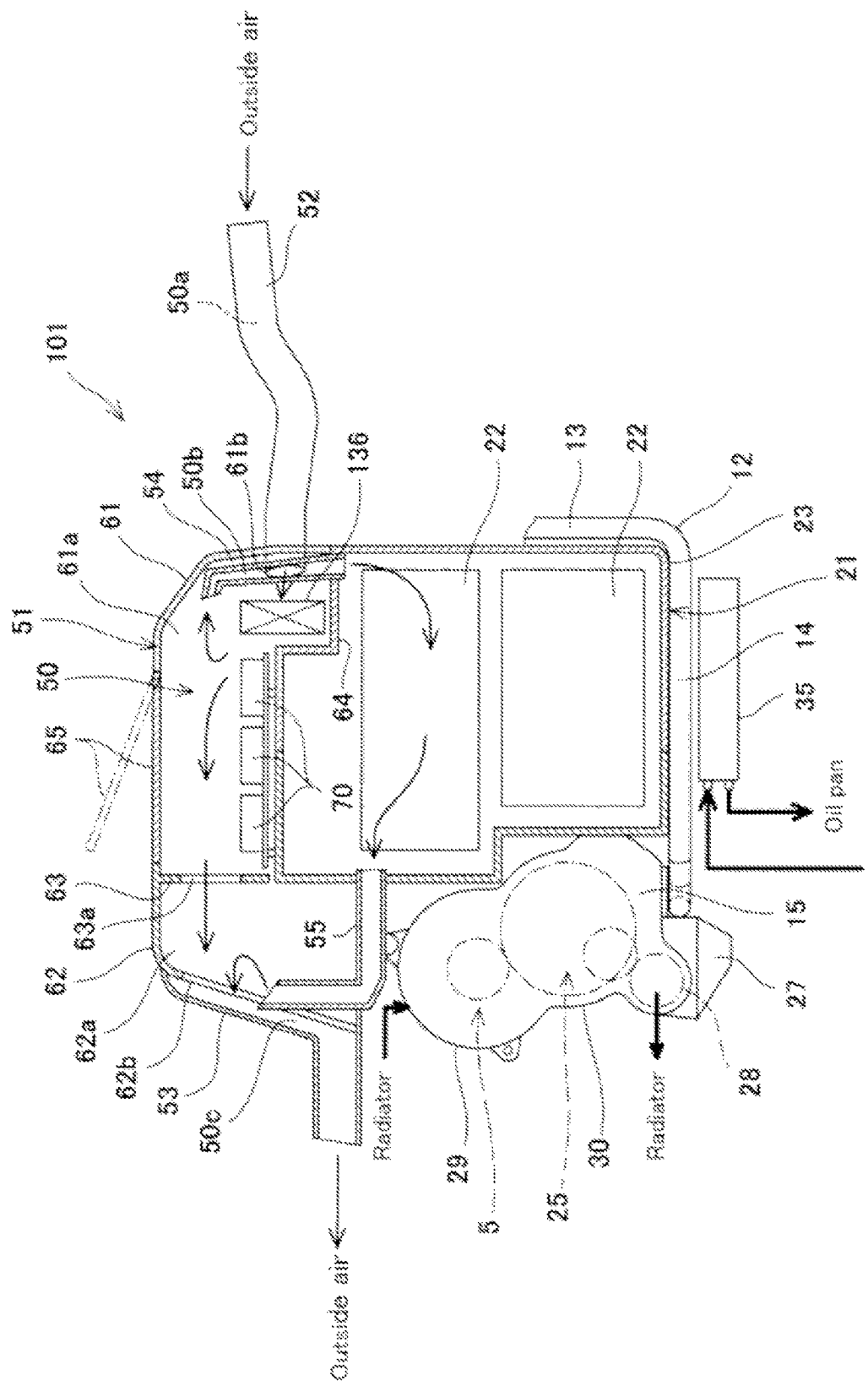
FIG. 4 is a cross-sectional view of a battery case and an air box of an electric motorcycle which is an exemplary straddle electric vehicle according to Embodiment 2 of the present invention.

FIG. 4 is a cross-sectional view of the battery case 23 and the air box 51 of an electric motorcycle 101 which is an exemplary straddle electric vehicle according to Embodiment 2 of the present invention. Hereinafter, differences between Embodiment 2 and Embodiment 1 will be mainly described.

As shown in FIG. 4, a radiator 136 is placed upstream of the battery case 23, in the air passage 50. In the present embodiment, the radiator 136 is placed in the inner space of the air box 51, to be precise, the inner space 61a of the front section 61. The upper portion of the front section 61 can be opened and closed by the lid 65. In the present embodiment, therefore, maintenance work for the radiator 136 can be easily carried out. To allow maintenance work to be carried out more easily, the inner space of the rear section 62 may be configured to be openable and closable, and the radiator 136 may be accommodated in the rear section 62.

In the present embodiment, the radiator 136 is placed in the inner space of the front section 61 such that the radiator 136 faces the ram air inlet. This allows the radiator 136 to serve as a filter so that the battery 22 can be protected from moisture as in Embodiment 1.

Figure 5:
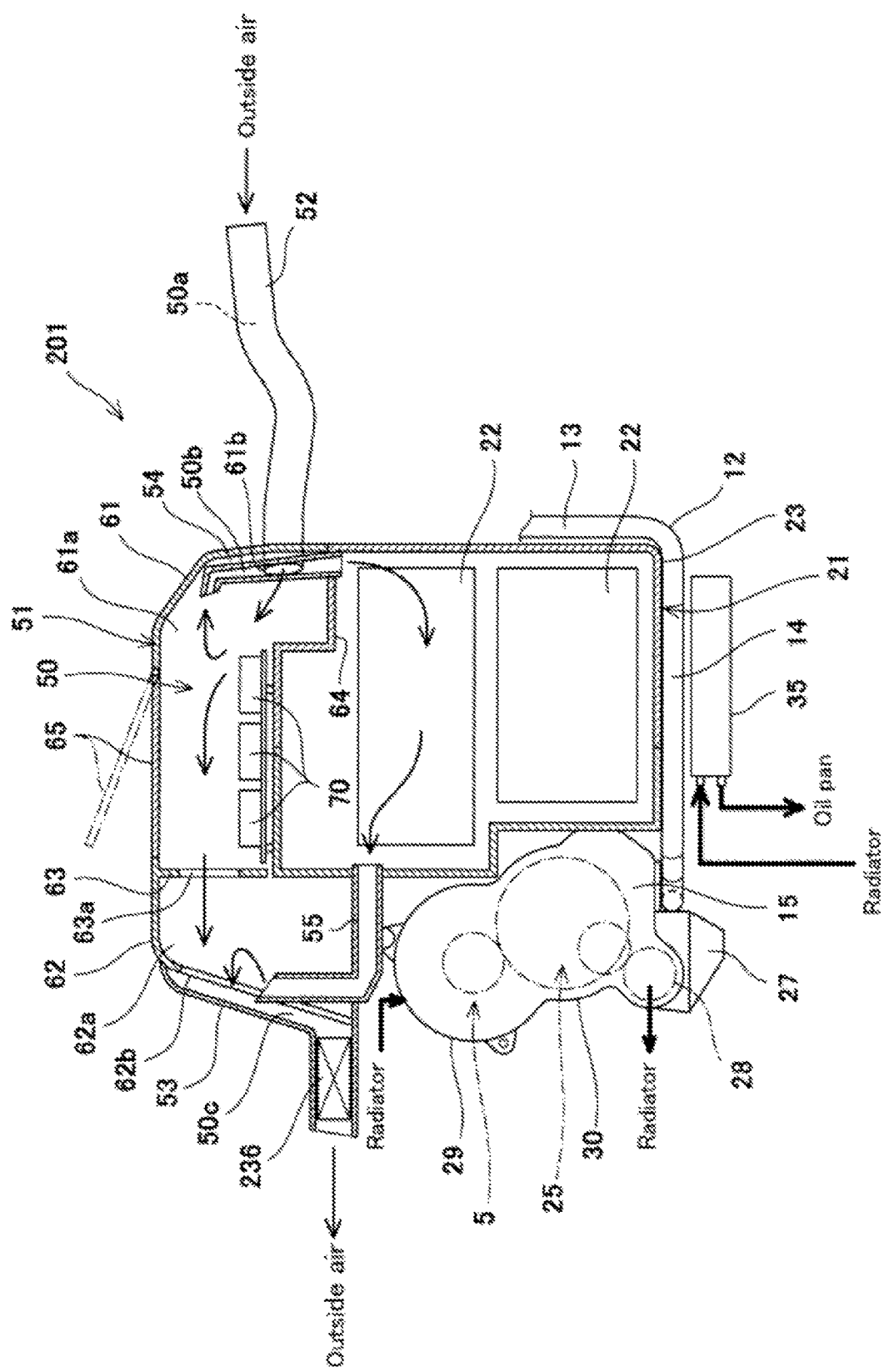
FIG. 5 is a cross-sectional view of a battery case and an air box of an electric motorcycle which is an exemplary straddle electric vehicle according to Embodiment 3 of the present invention.

FIG. 5 is a cross-sectional view of the battery case 23 and the air box 51 of an electric motorcycle 201 which is an exemplary straddle electric vehicle according to Embodiment 3 of the present invention. Hereinafter, differences between Embodiment 3 and the above described embodiments will be mainly described.

As shown in FIG. 5, a radiator 236 is placed downstream of the battery case 23, in the air passage 50. In the present embodiment, the radiator 236 is accommodated in the air discharge duct 53. Since the radiator 236 is placed downstream of the battery case 23 in this way, the battery 22 and the electric components 70 can be cooled more effectively while utilizing air for cooling the battery as a coolant for cooling the oil.

Figure 6:
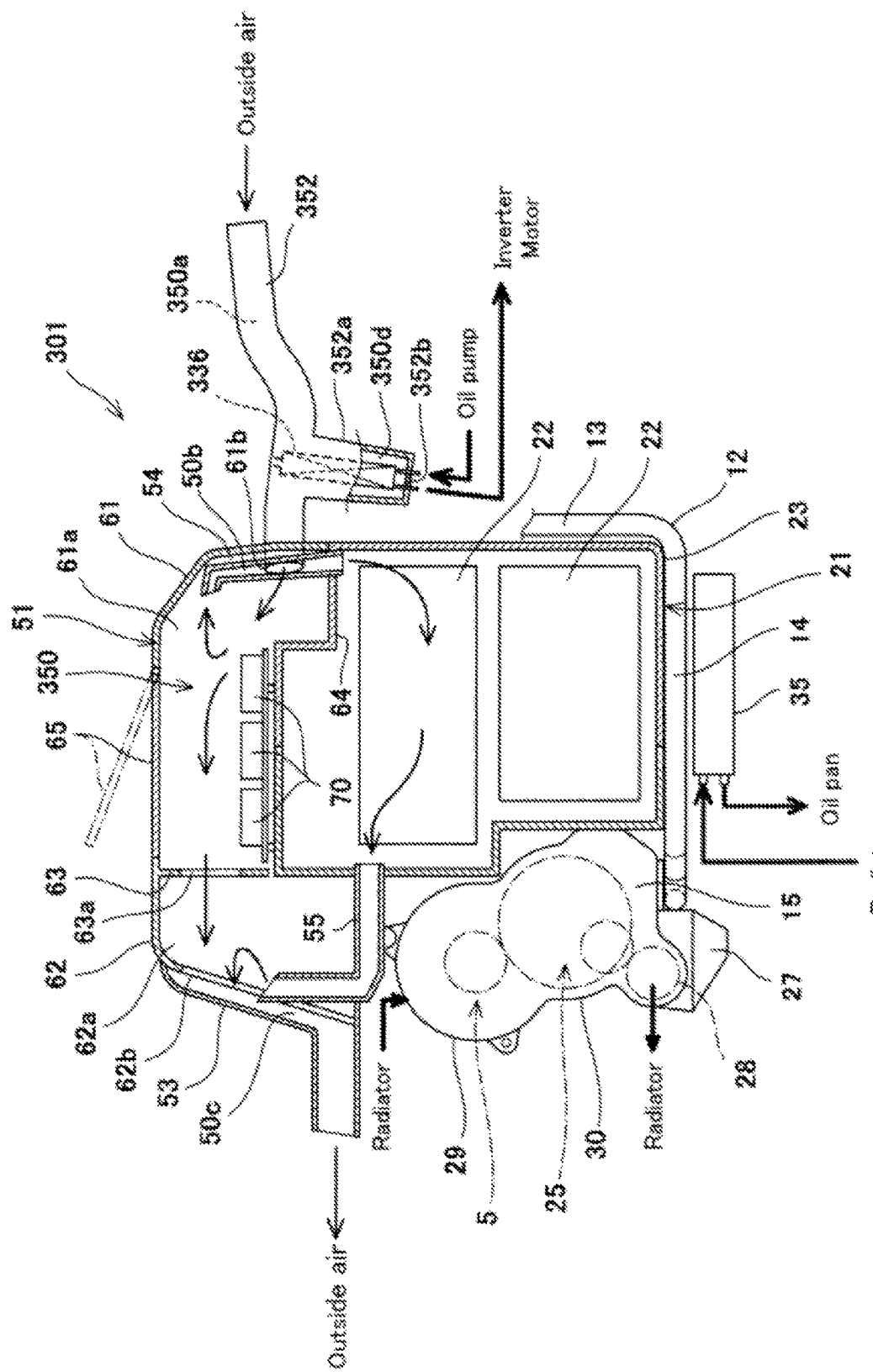
FIG. 6 is a cross-sectional view of a battery case and an air box of an electric motorcycle which is an exemplary straddle electric vehicle according to Embodiment 4 of the present invention.

FIG. 6 is a cross-sectional view of the battery case 23 and the air box 51 of an electric motorcycle 301 which is an exemplary straddle electric vehicle according to Embodiment 4 of the present invention. Hereinafter, differences between Embodiment 4 and the above described embodiments will be mainly described.

As shown in FIG. 6, an air passage 350 has an extended section 350*d* which is extended downward. In the present embodiment, an air intake duct 352 has a downward protruding section 352*a* which partially protrudes downward, and the extended section 350*d* is formed by the downward protruding section 352*a*. Specifically, in the present embodiment, the extended section 350*d* is located upstream of the battery case 23, in the air passage 350. This is merely exemplary, and the extended section 350*d* may be located downstream of the battery case 23, in the air passage 350.

A radiator 336 is placed in the extended section 350*d*. The radiator 336 is vertically elongated, and partitions the air passage 350 in a direction different from a vertical direction, within the extended section 350*d* which is extended downward. In the present embodiment, the extended section 350*d* is formed in a region extending substantially in the forward or rearward direction, in the air intake duct 352, and therefore, the radiator 336 partitions the air passage 350 substantially along the forward or rearward direction, along which the air passage 350 extends. This is merely exemplary. The direction in which the radiator 336 partitions the air passage 350 is suitably changed according to the direction in which the air passage extends, in a region in which the extended section is provided.

The lower end of the extended section 350*d* is in communication with the outside via a drain port 352*b* formed in the bottom wall of the downward protruding section 352*a*.

In accordance with the present embodiment, since the radiator 336 is placed in the extended section 350*d* which is formed by extending downward a portion of the air passage 350, the radiator 336 serves as a filter and the extended section 350*d* can suitably capture moisture contained in the ram air. Thus, a water separation capability can be further enhanced. In addition, the moisture captured in the extended section 350*d* can be discharged to the outside through the drain port 352*b* provided at the lower portion of the extended section 350*a*. This makes it possible to avoid a situation in which the captured moisture flows to a downstream side of the radiator (e.g., air box 51 and battery case 23).

Figure 7:
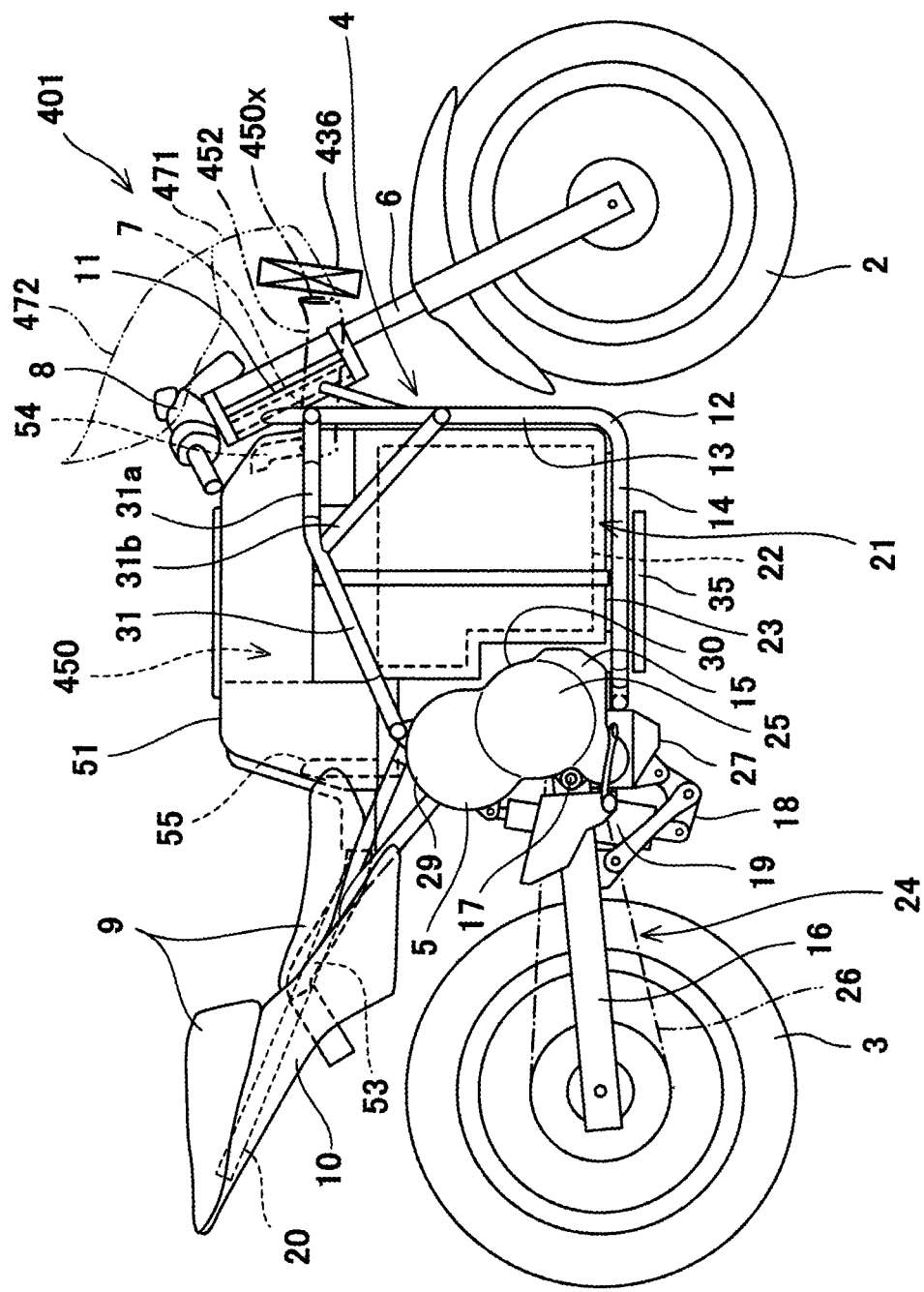
FIG. 7 is a right side view of an electric motorcycle which is an exemplary straddle electric vehicle according to Embodiment 5 of the present invention.

FIG. 7 is a cross-sectional view of an electric motorcycle 401 which is an exemplary straddle electric vehicle according to Embodiment 5 of the present invention. Hereinafter, differences between Embodiment 5 and the above described embodiments will be mainly described.

As shown in FIG. 7, the front opening of an air intake duct 452 serves as an air inlet 450*x* in the whole air passage 450. The air inlet 450*x* is an opening through which the ram air is taken into the air passage 450. In the present embodiment, the air inlet 450*x* is located in front of the head pipe 11 and is substantially as high as the head pipe 11. The air inlet 450*x* is placed within a front cowling 471 which is placed forward relative to the head pipe 11 and supports a wind shield 472. A radiator 436 is fastened to the front cowling 471 or the main frame 12, and placed forward relative to the air inlet 450*x*. In particular, in the present embodiment, the radiator 436 faces the front side of the air inlet 450*x* and is close to the air inlet 450*x*. There is no member interposed between the radiator 436 and the air inlet 450*x*. The radiator 436 placed in this way serves as a filter, and makes it possible to avoid a situation in which moisture contained in the ram air enters the air passage 450. The radiator 436 provided in the front cowling 471 receives the ram air sufficiently. Since the air inlet 450*x* is placed rearward relative to the radiator 436, the ram air passes through the radiator 436 smoothly. Therefore, the oil can be cooled effectively in the radiator 436 placed in this way.

Figure 8:
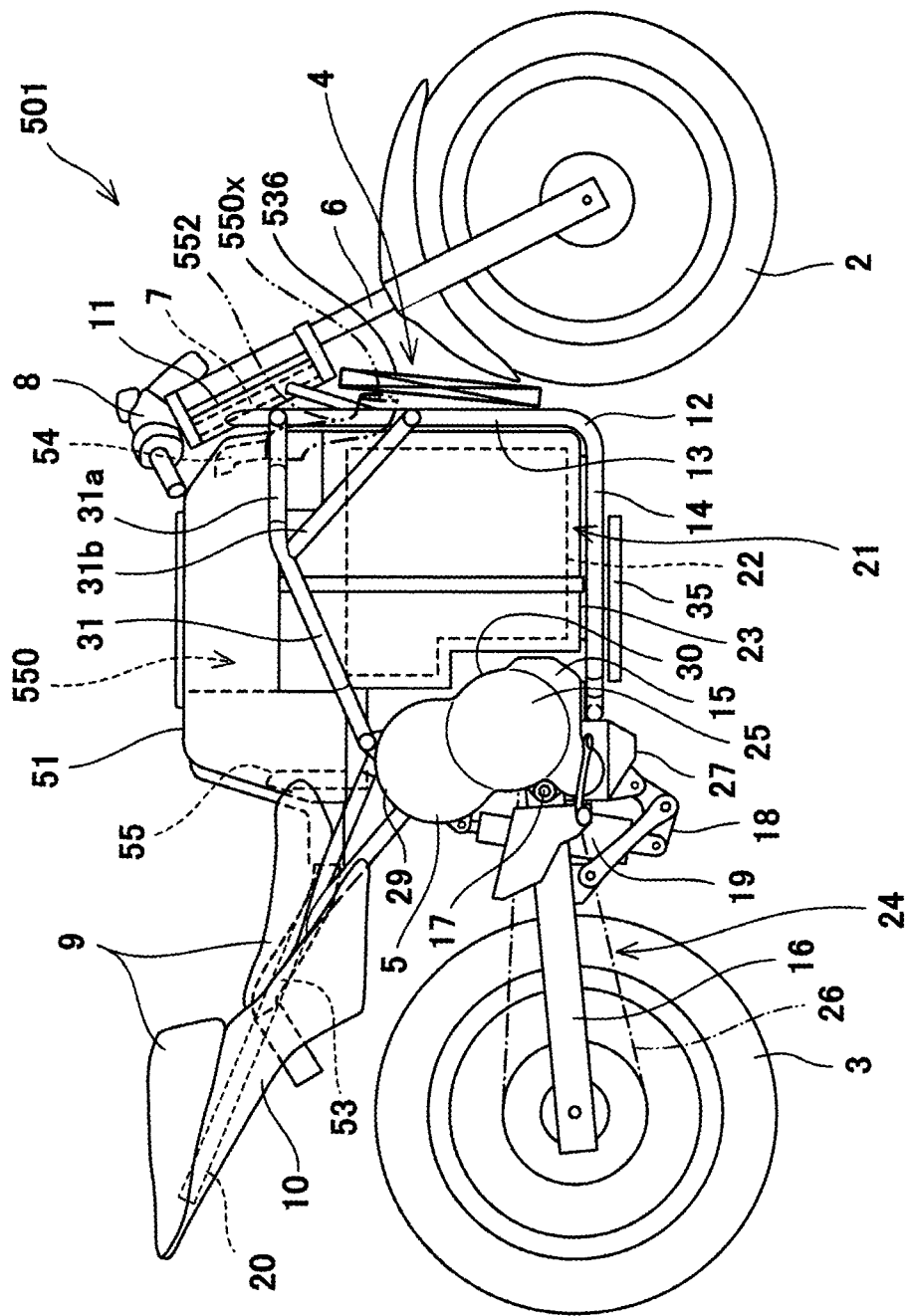
FIG. 8 is a right side view of an electric motorcycle which is an exemplary straddle electric vehicle according to Embodiment 6 of the present invention.

FIG. 8 is a cross-sectional view of an electric motorcycle 501 which is an exemplary straddle electric vehicle according to Embodiment 6 of the present invention. Hereinafter, differences between Embodiment 6 and the above described embodiments will be mainly described.

As shown in FIG. 8, a radiator 536 of the present embodiment is placed forward relative to an air inlet 550*x*. The radiator 536 faces the front side of the air inlet 550*x* and is closer to the air inlet 550*x*. There is no member interposed between the radiator 536 and the air inlet 550*x*. The front opening of an air intake duct 552 serves as the air inlet 550*x* of the whole air passage 550. The air intake duct 552 extends downward from the front end portion of the air box 51. The air inlet 550*x* is located below the head pipe 11, above the front wheel 2 and rearward relative to the front wheel 2. The radiator 536 is fastened to a side cowling (not shown) or the main frame 12 and placed forward relative to the air inlet 550*x*. In the present embodiment, as in Embodiment 5, the radiator 536 serves as a filter, and makes it possible to avoid a situation in which moisture contained in the ram air enters the air passage 550. Since the radiator 536 receives the ram air sufficiently, and the ram air passes through the radiator 536 smoothly, the oil can be cooled effectively in the radiator 536.

Although the electric motorcycle has been exemplarily described in the embodiments of the present invention, the present invention is applicable to other straddle vehicles such as an all terrain vehicle (ATV), or a three-wheeled vehicle. Although the vehicle which does not include an internal combustion engine and drives only by the driving power generated by an electric motor is exemplarily described as an electric vehicle, the present invention is also applicable to a hybrid vehicle including an internal combustion engine in addition to an electric moor.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has advantages that it becomes possible to cool a battery and other electric components with a simple structure and suitably suppress the occurrence of problems in the battery or the like, and is effectively applied to a straddle electric vehicle including a radiator and a battery case.

The invention claimed is:

1. A straddle electric vehicle which drives by a driving power generated by an electric motor, the straddle electric vehicle comprising:
    a battery case accommodating a battery which is an electric power supply for the electric motor;
    an inverter which converts DC power stored in the battery into AC power and supplies the AC power to the electric motor;
    an air passage through which ram air is guided to an interior of the battery case and discharges air from the battery case;
    a radiator for cooling a coolant used to cool the inverter or the electric motor using water or oil; and
    an air box which is attached to an upper portion of the battery case and constitutes a portion of the air passage,
    wherein an upper portion of the air box is openable and closable; and
    wherein the radiator is placed inside the air box.

2. The straddle electric vehicle according to claim 1, wherein the radiator is placed upstream of the battery case within the air passage.

3. The straddle electric vehicle according to claim 1, wherein the radiator is placed downstream of the battery case within the air passage.

4. A straddle electric vehicle which drives by a driving power generated by an electric motor; the straddle electric vehicle comprising:
    a battery case accommodating a battery which is an electric power supply for the electric motor;
    an inverter which converts DC power stored in the battery into AC power and supplies the AC power to the electric motor;
    an air passage through which ram air is guided to an interior of the battery case and discharges air from the battery case; and
    a radiator for cooling a coolant used to cool the inverter or the electric motor using water or oil,
    wherein the air passage has an extended section which is extended downward;
    wherein the radiator is placed in the extended section; and
    wherein the extended section is provided with a drain hole at a lower end of the extended section.

5. A straddle electric vehicle which drives by a driving power generated by an electric motor, the straddle electric vehicle comprising:
    a battery case accommodating a battery which is an electric power supply for the electric motor;
    an inverter which converts DC power stored in the battery into AC power and supplies the AC power to the electric motor;
    an air passage through which ram air is guided to an interior of the battery case and discharges air from the battery case; and
    a radiator for cooling a coolant used to cool the inverter or the electric motor using water or oil,
    wherein the radiator is placed upstream of the battery case in a flow direction of the air for cooling the battery case;
    wherein the air passage includes an inner space of an air box, a passage section used to deliver the air from an interior of the air box to the interior of the battery case, and a bypass passage which communicates the inner space of the air box to a region downstream of the battery case by bypassing an inner space of the battery case;
    wherein an electric component is accommodated in the inner space of the air box; and
    wherein the ram air which has flowed through the radiator forms an air flow moving toward the passage section to cool the battery and an air flow moving toward the bypass passage to cool the electric component, in the interior of the air box.

6. The straddle electric vehicle according to claim 5, wherein the electric component is placed above the battery.

7. The straddle electric vehicle according to claim 5, wherein the radiator separates a moisture from the ram air flowing toward the battery case.

* * * * *